(12) United States Patent
Beye (10) Patent No.: US 11,411,929 B2
(45) Date of Patent: Aug. 9, 2022

(54) VIRTUAL AND PORTABLE RESOURCE EVENT CONTAINER FOR USER IDENTITY-PROTECTION

(71) Applicant: BANK OF AMERICA CORPORATION, Charlotte, NC (US)

(72) Inventor: Ricki A. Beye, Lambertville, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 568 days.

(21) Appl. No.: 16/279,643

(22) Filed: Feb. 19, 2019

(65) Prior Publication Data
US 2020/0267126 A1 Aug. 20, 2020

(51) Int. Cl.
*H04L 9/40* (2022.01)
*G06Q 10/08* (2012.01)
*G06Q 50/18* (2012.01)

(52) U.S. Cl.
CPC ... *H04L 63/0421* (2013.01); *G06Q 10/08355* (2013.01); *G06Q 50/188* (2013.01); *H04L 63/08* (2013.01); *H04L 63/0838* (2013.01); *H04L 63/0846* (2013.01)

(58) Field of Classification Search
CPC . H04L 63/0421; H04L 63/08; H04L 63/0838; H04L 63/0846; G06Q 50/188; G06Q 10/08355
USPC .......................................................... 705/80
See application file for complete search history.

(56) References Cited

U.S. PATENT DOCUMENTS

| | | | |
|---|---|---|---|
| 6,101,482 A | 8/2000 | Diangelo et al. | |
| 6,876,977 B1 | 4/2005 | Marks | |
| 7,124,098 B2 | 10/2006 | Hopson et al. | |
| 7,287,003 B2 | 10/2007 | Hodson et al. | |
| 7,577,592 B2 | 8/2009 | Tarvydas et al. | |
| 7,640,193 B2 | 12/2009 | Crespo et al. | |
| 7,949,572 B2 | 5/2011 | Perrochon et al. | |
| 8,015,071 B2 | 9/2011 | Crespo et al. | |

(Continued)

OTHER PUBLICATIONS

Kim, Byung Ryong, and Ki Chang Kim. "Anonymous communication systems in P2P network with random agent nodes." In International Conference on Grid and Cooperative Computing, pp. 767-775. Springer, Berlin, Heidelberg, 2005. (Year: 2005).*

*Primary Examiner* — Suraj M Joshi
*Assistant Examiner* — Melaku Y Habtemariam
(74) *Attorney, Agent, or Firm* — Moore & Van Allen PLLC; James C. Edwards (57) ABSTRACT

A universal and portable virtual resource event container that is provided by an identity-protection entity on behalf of a cloaked user. The resource event container is configured to log into or otherwise access networked sites and make calls to network entity APIs as directed by the user as they navigate the site and select objects for inclusion in the virtual resource event container instead of the resource event container provided by the network site. Subsequently, the resource event is completed between the network entity and the identity-protection entity. The network entity is unaware of the identity, or any other personal information associated with the user. In addition, objects in the resource event are delivered in an anonymous fashion, such that, the final delivery destination is unknown to the network entity and one or more hops along the delivery route. Thus, the present invention affords a user complete anonymity throughout the entire resource event.

17 Claims, 4 Drawing Sheets

(56) References Cited

U.S. PATENT DOCUMENTS

| | | | |
|---|---|---|---|
| 8,204,799 B1 | 6/2012 | Murray et al. | |
| 8,315,919 B1 | 11/2012 | Perrochon et al. | |
| 8,589,255 B2 | 11/2013 | Glazer et al. | |
| 8,756,108 B2 | 6/2014 | Stocker | |
| 9,922,327 B2 | 3/2018 | Johnson et al. | |
| 10,108,996 B2 | 10/2018 | Beye et al. | |
| 10,109,003 B1 | 10/2018 | Jenkins et al. | |
| 10,127,599 B2 | 11/2018 | Maenpaa et al. | |
| 10,242,398 B2 | 3/2019 | Woo et al. | |
| 2002/0156685 A1 | 10/2002 | Ehrlich et al. | |
| 2005/0177463 A1 | 8/2005 | Crutchfield et al. | |
| 2008/0059402 A1* | 3/2008 | Mulhern | G06Q 30/02 |
| 2012/0253895 A1 | 10/2012 | Bennett et al. | |
| 2014/0207611 A1* | 7/2014 | Cleary | G06Q 30/0633 |
| | | | 705/26.8 |
| 2015/0254660 A1* | 9/2015 | Allison, Jr. | G06Q 20/18 |
| | | | 705/44 |
| 2018/0174131 A1* | 6/2018 | Brudnicki | G06Q 20/227 |
| 2020/0402138 A1* | 12/2020 | Isaacson | G06Q 20/203 |

\* cited by examiner

VIRTUAL AND PORTABLE RESOURCE EVENT CONTAINER FOR USER IDENTITY-PROTECTION

FIELD OF THE INVENTION

The present invention is generally directed to online shopping and, more specifically, a virtual and portable resource event container that allows for users to securely and anonymously conduct resource events on a network and a corresponding means for anonymous delivery of objects associated with the resource events.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, computer program products and/or the like for implementing a universal and portable virtual resource event container that is maintained/operated by an identity-protection entity on behalf of a user. In this regard, at the request of a user the virtual resource event container is configured to log into or otherwise access network sites and calls network entity Application Programming Interfaces (APIs) as directed by the user as they navigate the site and select objects for placement in the virtual resource event container instead of the resource event container provided by the network entity. Once the user has agreed to secure the objects in the virtual resource event container, a resource event is conducted between the network entity and the identity-protection entity on behalf of the user. In this regard, the identity-protection entity acts as a resource event proxy for the user and the network entity is unaware of the identity, or any other personal information of the user.

To further the anonymous resource event experience the present invention provides the capability to deliver objects to the user without the network entity being aware of the final delivery destination designated by the user. Specifically, according to embodiments of the invention, once a user has agreed to secure an object, each object is assigned a Universally Unique Identifier (UUID) which acts a pointer to next hop in the delivery route of the object and a series of UUIDs pointers dynamically and sequentially assigned collectively maps to a final delivery destination assigned by the user. In this regard, the network entity is only provided information as to the first hop in the delivery route and is unaware of the actual final delivery destination. Further, each hop in the delivery route submits the UUID to the identity-protection entity to receive the location of the next hop in the delivery route and, thus, is unaware of the final delivery destination. In some embodiments of the invention, as discussed in more detail below, even the final hop in the delivery route may be unaware of the final delivery destination.

Moreover, since the identity-protection entity may be a financial institution, a card provider or the like, embodiments of the invention provide for the identity-protection entity to optionally logically negotiate the bill of sale for the items prior to conducting the transaction. In other specific embodiments of the invention, the identity-protection entity may optionally negotiate shipping logistics, such as shipping carrier, shipping timing, shipping route, shipping cost for the delivery of one or more of the items in the transaction.

In further embodiments of the invention, security in the shipment delivery is realized by providing for authentication of the user or another designated recipient as a rightful individual authorized to take possession of the items upon delivery. In specific embodiments of the invention, the final delivery entity may request generation of a time-sensitive One-Time-Passcode (OTP) that is sent to device (e.g., mobile device) associated with the user or designated item recipient. The user or designated item recipient is then required to present the OTP and, in response to validating the OTP, the user or designated item recipient is allowed to gain possession of the item(s).

A system for protecting an identity of a user during on resource event defines first embodiments of the invention. The system includes a computing platform including a memory and one or more processing devices in communication with the memory. The system additionally includes an identity-protection resource event module that is stored in the memory and executable by the one or more processing devices. The module is configured associate a user with a virtual, portable resource event container that is maintained by an identity-protection entity and access a network site with the virtual resource event container. The module is further configured to, in response to the user selecting one or more objects from the network site for entry into the virtual resource event container and acquiescing to secure the one or more objects in the virtual resource event container, conduct a resource event between the identity-protection entity and the network entity that secures the one or more objects on behalf of the user. The user navigates the network site, selects the one or more objects, and acquiesces to secure the one or more items, and the resource event is completed absent the network entity possessing identity information associated with the user.

In specific embodiments the system further includes an identity-protection resource event delivery module that is stored in the memory and executable by the one or more processing devices. The module is configured, in response to the user acquiesces to secure the one or more objects, assign a universally unique identifier (UUID) to each of the one or more objects in the resource event. The UUID serves as a pointer to a next hop in the delivery route of a corresponding object and a series of UUIDs pointers dynamically and sequentially assigned collectively maps to a final delivery destination assigned by the user. In this regard, the network entity and one or more hops in the delivery route are unaware of the final delivery destination. In such embodiments of the system, once the at least one of objects reach a hop in the delivery route, the module is further configured to authenticate the hop as a rightful possessor of at least one of the items, receive, from the hop in the delivery route, one or more of the UUIDs associated with the at least one of the objects, and provide the hop with a shipping location of a next hop in the delivery route or the final shipping destination for each of the one or more UUIDs. In specific embodiments of the system, the module is further configured, in response to providing the shipping hop with the shipping location of the next shipping hop in the delivery route, reassign a new UUID to each of the at least one of the items.

In still other specific embodiments of the system, the identity-protection resource event delivery module is further configured to allow the user to dynamically change, while the objects(s) are on route for delivery to the user, at least one of (i) the final delivery destination for at least one of the objects, and (ii) a length of time for delivery for at least one of the objects. In other embodiments of the of the system, the identity-protection resource event delivery module is configure to, with or without the knowledge or consent of the user, dynamically alter delivery logistics of at least one of the objects while the at least one of the objects is on route for delivery to the user. Altering the delivery logistics includes at least one of (i) changing carriers, (ii) changing one or more hops, and/or (iii) changing a time for delivery of the at least one of the objects.

In specific embodiments of the system, the identity-protection resource event module is configured to associate the user with the virtual resource event container by associating one or more used-defined preselected resource depositories and a user-defined preselected final delivery destination with the virtual resource event container. Such that when the user uses the virtual resource event container to conduct a resource event the preselected resource depository(s) and/or pre-selected delivery destination is used unless the user changes either prior to completing the resource event.

In still further specific embodiments of the system, the identity-protection online resource event module further includes a resource event negotiation sub-module. The resource event negotiation sub-module is configured to, prior to conducting the resource event, automatically negotiate a bill of sale for the one or more items. The negotiation may be based on at least one of (i) discounts afforded the identity-protection entity by the network entity, (ii) other network entities or physical object-providers currently offering at least one of the one or more objects at a lower price than the network entity, and (iii) a volume acquisition by the identity-protection entity of at least one of the one or more objects on behalf of a plurality of other users.

In other specific embodiments of the system, the identity-protection online resource event module further includes a delivery negotiation sub-module. The delivery negotiation module is configured to, prior to conducting the resource event, automatically negotiate delivery logistics for at least one of the one or more objects. The negotiation is based on at least one of (i) a desired carrier, (ii) time of delivery and (iii) cost of delivery.

In yet other specific embodiments the system includes a delivery authentication module that is stored in the memory and executable by the one or more processing devices. The delivery authentication module is configured to receive a request to generate a time-sensitive one-time passcode (OTP) from a shipping entity providing at least one of the objects to a final delivery destination, provide the OTP to the user or a designated object recipient, and, in response to the user presenting the OTP to the shipping entity and determining that the OTP presented by the user matches the generated OTP and is within a predetermined time period, provide possession of the at least one of the objects to the user or the designated object recipient. On other related embodiments of the system, the delivery authentication module is configured to, in response to determining that a shipping entity is within a predetermined area of a final delivery destination for at least one of the objects, generate a time-sensitive one-time passcode (OTP) and provide the OTP to the user or a designated object recipient and, in response to the user presenting the OTP to the shipping entity and determining that the OTP presented by the user matches the generated OTP and is within a predetermined time period, providing possession of the at least one of the objects to the user or the designated object recipient.

A computer-implemented method for protecting an identity of a user during on online transaction defines second embodiments of the invention. The method is executed by one or more processing devices includes associating a user with a virtual shopping cart maintained by an identity-protection entity and accessing a merchant website with the virtual shopping cart. The method further includes, in response to the user selecting one or more items from the merchant website for entry into the virtual shopping cart and agreeing to acquire the one or more items in the virtual shopping cart, conducting a transaction between the identity-protection entity and the merchant that acquires the one or more items on behalf of the user. The user navigates the merchant website, selects the one or more goods, and agrees to purchase the one or more items, and the transaction is completed absent the online merchant possessing identity information associated with the user.

In specific embodiments the computer-implemented method further includes, in response to the user agreeing to acquire the one or more items, assigning a universally unique identifier (UUID) to each of the one or more items in the transaction. The UUID is a pointer to a next shipping hop in the delivery route of a corresponding item and a series of UUIDs pointers dynamically and sequentially assigned collectively maps to a final delivery destination assigned by the user. In such embodiments, the online merchant and one or more shipping hops in the delivery route are unaware of the final shipping destination. In further related embodiments the computer-implemented method further includes authenticating a shipping hop in the delivery route as a rightful possessor of at least one of the items, receiving, from the shipping hop in the delivery route, one or more of the UUIDs associated with the at least one of the items and providing the shipping hop with a shipping location of a next shipping hop in the delivery route for each of the one or more UUIDs.

In other specific embodiments the computer-implemented method further includes, prior to conducting the transaction, automatically negotiating a bill of sale for the one or more items. The negotiation may be based on at least one of (i) discounts afforded the identity-protection entity by the online merchant (ii) other online or physical merchants currently offering at least one of the one or more items at a lower price than the online merchant and (iii) a volume acquisition of at least one of the one or more items on behalf of a plurality of other users. In further related embodiments the computer-implemented method includes, prior to conducting the transaction, automatically negotiate shipping logistics for at least one of the one or more items. The negotiation is based on at least one of (i) a desired shipping carrier, (ii) time of delivery and (iii) cost of delivery.

In still further specific embodiments the computer-implemented method includes receiving a request to generate a time-sensitive one-time passcode (OTP) from a shipping entity providing at least one of the items to a final delivery destination, providing the OTP to the user or a designated item recipient, and, in response to the user presenting the OTP to the shipping entity and determining that the OTP presented by the user matches the generated OTP and is within a predetermined time period, providing possession of the at least one of the items to the user or the designated item recipient.

A computer program product defines third embodiments of the invention. The computer program product includes a non-transitory computer-readable medium. The computer-readable medium includes a first set of codes for causing a computer to associate a user with a virtual shopping cart maintained by an identity-protection entity and a second set of codes for causing a computer to access a merchant website with the virtual shopping cart. The computer-readable medium additionally includes a third set of codes for causing a computer to, in response to the user selecting one or more items from the merchant website for entry into the virtual shopping cart and agreeing to acquire the one or more items in the virtual shopping cart, conduct a transaction between the identity-protection entity and the merchant that acquires the one or more items on behalf of the user. The user navigates the merchant website, selects the one or more goods, and agrees to purchase the one or more items, and the transaction is completed absent the online merchant possessing identity information associated with the user.

Thus, according to embodiments of the invention, which will be discussed in greater detail below, the present invention provides for a universal and portable virtual shopping cart that is maintained/operated by an identity-protection entity on behalf of a cloaked user. In this regard, the identity-protection entity acts as a purchasing proxy for the user and the online website is unaware of the identity, or any other personal information of the user. In addition, embodiments of the invention provide for items in the online transaction to be shipped, such that, the final delivery destination is unknown to the online merchant and one or more shipping hops along the shipping route. Thus, the present invention affords a user complete anonymity throughout the entire online transaction process.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Maintaining the privacy of personal information is not only a problem on the Internet, but has increasing become a concern in physical settings, such as, traditional brick and mortar retail locations, public areas and the like. The rapid growth rate in the deployment of video technology and facial recognition algorithms in such physical settings means that these entities have the capability to identify any individual that visits these locales and build user information files associated with the activities that they conduct within these settings. As such, it is becoming increasing more difficult for consumers to conduct shopping or other endeavors without intrusion into their personal lives and habits.

Online shopping began the intrusion into privacy with site-by-site shopping carts, each one carrying a wealth of information associated with the user. For example, once a user creates an online account with a website, associates a credit/debit card to the account and begins the shopping process, each purchase made by the user builds a persistent personal shopping information file that may be leveraged by both the online merchant and the credit/debit card provider. However, since seemingly little can be done to protect one's identity in the increasing intrusive physical setting environment, it may more conceivable to devise ways to fully protect a user's anonymity and privacy in the online environment, in which the user is not physically present.

Thus, systems, apparatus, and methods are described in detail below for implementing a universal and portable virtual shopping cart for conducting anonymous transactions with online merchants. The virtual shopping cart is maintained/operated by an identity-protection entity (e.g., financial institution, credit/debit card provider or the like) on behalf of a user and, as such the only identity that is exposed during an online transaction is that of the identity-protection entity. In this regard, at the request of a user the virtual shopping cart is configured to log into or otherwise access online merchant sites and calls merchant Application Programming Interfaces (APIs) as directed by the user as they navigate the site and select items for placement in the virtual shopping cart. Once the user has agreed to purchase the items in the virtual shopping cart, a transaction is conducted between the online merchant and the identity-protection entity on behalf of the user. In this regard, the identity-protection entity acts as a purchasing proxy for the user and the online website is unaware of the identity, or any other personal information of the user.

To further the anonymous shopping experience the present invention provides the capability to ship items to the user without the online merchant being aware of the final delivery destination designated by the user (i.e., the user's residential address, place of business, drop-box location or the like). Specifically, according to embodiments of the invention, once a user has agreed to purchase an item, each item is assigned a Universally Unique Identifier (UUID) which acts a pointer to next hop in the shipping route of the item and a series of UUIDs pointers dynamically and sequentially assigned collectively maps to a final delivery destination assigned by the user. In this regard, the online merchant is only provided information as to the first hop in the shipping route and is unaware of the actual final delivery destination. Further, each hop in the shipping route submits the UUID to the identity-protection entity to receive the location of the next hop in the shipping route and, thus, is unaware of the final delivery destination. In some embodiments of the invention, as discussed in more detail below, even the final hop in the shipping route may be unaware of the final delivery destination.

Moreover, since the identity-protection entity may be a financial institution, a card provider or the like, embodiments of the invention provide for the identity-protection entity to optionally logically negotiate the bill of sale for the items prior to conducting the transaction. In other specific embodiments of the invention, the identity-protection entity may optionally negotiate shipping logistics, such as shipping carrier, shipping timing, shipping route, shipping cost for the delivery of one or more of the items in the transaction.

In further embodiments of the invention, security in the shipment delivery is realized by providing for authentication of the user or another designated recipient as a rightful individual authorized to take possession of the items upon delivery. In specific embodiments of the invention, the final delivery entity may request generation of a time-sensitive One-Time-Passcode (OTP) that is sent to device (e.g., mobile device) associated with the user or designated item recipient. The user or designated item recipient is then required to present the OTP and, in response to validating the OTP, the user or designated item recipient is allowed to gain possession of the item(s).

Figure 1:
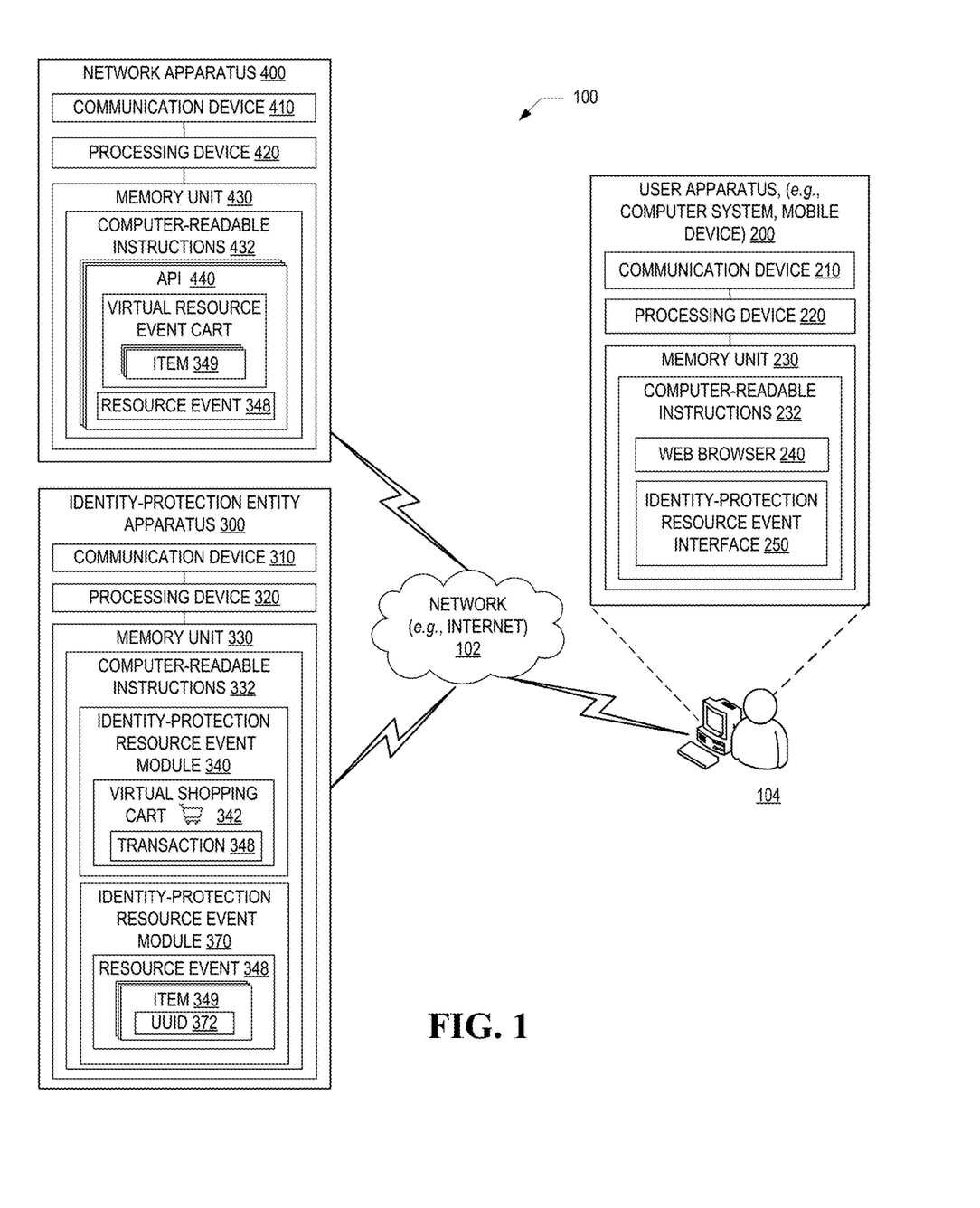
FIG. 1 is a schematic diagram of a system for conducting anonymous resource events with a virtual resource event container, in accordance with some embodiments of the present disclosure.

Referring to FIG. 1, a block diagram of is depicted of a system for providing anonymous online transactions and shipping, in accordance with embodiments of the present invention. FIG. 1 illustrates a system 100 in which the user apparatus 200, the network apparatus 400 and the identity-protection entity apparatus 300 interact over a network 102, such as the Intranet, other local area networks (LAN) or the like. It should be noted that an apparatus, as used herein, may comprise one or multiple different computing devices. For example, user apparatus 200 may comprise a personal computer, a mobile device or the like and identity-protection entity apparatus 300 and online merchant apparatus 400 may comprise server(s), storage device(s) and the like.

The user apparatus 110 is associated with user 104 who has a desire to make an online purchase anonymously (i.e., without providing the online merchant any personal identifying information, such as name, address, payment account or the like). The user apparatus 200 includes, in the embodiment shown, a processing device 220 communicatively coupled with a communication device 210 and a memory unit 230. The processing device 220, in some embodiments, is configured for controlling operation of the communication device 210 in order to facilitate communication across the network 102, such as, for example, with the identity-protection entity apparatus 300 and the online merchant apparatus. The memory unit 230 is configured for storing computer-readable instructions 232 such as an operating system, applications, other computer program code and the like. In some embodiments of the invention, the computer-readable instructions include a web browser 240 configured for accessing information on the Internet/World Wide Web, such as online merchant apparatus 400 and identity-protection entity computing apparatus 300.

In further embodiments of the invention, the computer-readable instructions 232 include an identity-protection resource event interface 250 which may be configured to access the identity-protection resource event module 340 of the identity-protection entity apparatus 300 to enroll in or otherwise acquiesce in the participation of an identity-protection program. An identity-protection program, as implemented by the identity-protection entity, allows users to conduct anonymous resource events at participating network entities. Enrolling in the identity-protection program may include creating a user information file, which includes personal information, such as name, preferred/preselected final delivery destination, preferred/preselected payment account(s) and the like. Since the identity-protection entity is typically a trusted entity, the identity-protection entity will provide a higher level of security/trust to the user information file. For example, the identity-protection entity may be a financial institution, a credit/debit card provider or the like. In specific embodiments the identity-protection resource event interface 250 may be a sub-component of a mobile banking application or other application running on the user apparatus 200.

In addition, once enrolled in the program, the identity-protection resource event interface 250 may be configured to access the identity-protection resource event module 340 to initiate an anonymous resource event (i.e., acquire/associate a virtual resource event container with the user and access one or more network sites with the virtual resource event container) as will be explained in greater detail, infra.

Further, the identity-protection resource event interface 250 may be configured to allow the user to dynamically change delivery parameters during delivery (i.e., after the resource event has completed and the delivery of the item(s) has commenced). In this regard, the user may change final delivery destination (e.g., from a home address to a temporary/vacation address or the like), change delivery time (e.g., hasten or delay delivery) or the like.

In other embodiments of the invention, the functionality of the identity-protection resource event interface 250 may be provided by the identity-protection entity, such as via a website or the like (e.g., online banking), obviating the need to include identity-protection online resource event interface 250 within the user apparatus 200.

The identity-protection entity apparatus 300 may comprise one or more servers, memory/storage devices and the like. As previously mentioned, in some embodiments of the invention, the identity-protection entity may be a financial institution, credit/debit card provider or the like. A financial institution, credit/debit card provider not only provides the user with a level of security and confidence in terms of safe-keeping personal information, but they also possess the capability to conduct resource events with network entities on behalf of the user.

The identity-protection entity apparatus 300 includes a processing device 320 communicatively coupled with a communication device 310 and a memory unit 330. The processing device 320 may be configured for Artificial Intelligence (AI) processing, machine-learning processing or the like as dictated by various embodiments of the invention. The processor 320 is configured for controlling operation of the communication device 310 for communicating over the network 102 such as with the user apparatus 200 and/or the network apparatus 400. The memory unit 300 is configured for storing computer-readable instructions 332, such as, for example, an operating system, other applications, other computer executable program code and the like.

According to embodiments of the invention, the computer-readable instructions 332 include an identity-protection resource event module 340 that is configured to, once a user has been properly authenticated, associate a user 104 with a virtual resource event container 342. The virtual resource event container 342 is maintained/operated by the identity-protection entity. The association of the virtual resource event container 342 to the user 104 may be permanent (e.g., for the period in which the user 104 is enrolled an identity-protection program) or may be temporary (e.g., for a predetermined period of time, a predetermined number of network site visits, one-time only use or the like). Associating the user 104 with a virtual resource event container 342 may include associating one or more user payment accounts and/or a final delivery destination with the virtual resource event container 342.

The virtual resource event container 342 is computer-readable code (i.e., software) that is generic in type, such that the virtual resource event container 342 can be readily configured to integrate with any networked site, so as to mimic and replace the actual resource event container provided by the network entity. In this regard, in specific embodiments of the invention, the virtual resource event container 342 is configured to access networked sites and interface with Application Programming Interfaces (APIs) at the networked site to allow a user, as they navigate the site, to select items for placement in the virtual resource event container 342 and, in response to the user agreeing to acquire the objects, conduct a resource event 348 between the network entity and the identity-protection entity on behalf of the user (i.e., the network entity is unaware of who the user is or any other information pertaining to the user). Further, since, in some embodiments of the invention, the user is navigating the network site via the identity-protection entity, the network site will have no way of "identifying" the user through use of an Internet Protocol (IP) address, device fingerprint or the like.

The generic nature of the virtual resource event container 342 means that the user can use the resource event container at various different network entities (e.g., any network entity that acquiesces in the use of the virtual resource event container 342 at their sites), making the virtual resource event container highly portable. In specific embodiments of the invention, the user may be able to visit multiple network sites with the virtual resource event container 342, select objects from various different network entities for entry into the virtual resource event container 342 and, in response to the user agreeing to acquire the objects, conduct what appears to the user as a single resource event (i.e., the entity-protection entity conducts a resource event with each network entity having objects in the virtual resource event container 342 on behalf of the user). In other embodiments of the invention, the virtual resource event container 342 may be configured such that individual resource events between the network entity and the identity-protection entity are conducted on behalf of the user prior to the user leaving one network site with the virtual resource event container 342 and accessing another networked entity with the virtual resource event container 342.

In other specific embodiments of the invention, the virtual resource event container 342, which is still maintained/operated by the identity-protection entity, may reside at the network site and the user may check-out or otherwise choose to use a virtual resource event container 342 when visiting a network site. In such embodiments of the invention, a user may be required, in the event of first-time use, to enroll in the identity-protection program for one-time use or ongoing/permanent use of the virtual resource event container 342 at the network site.

Figure 3:
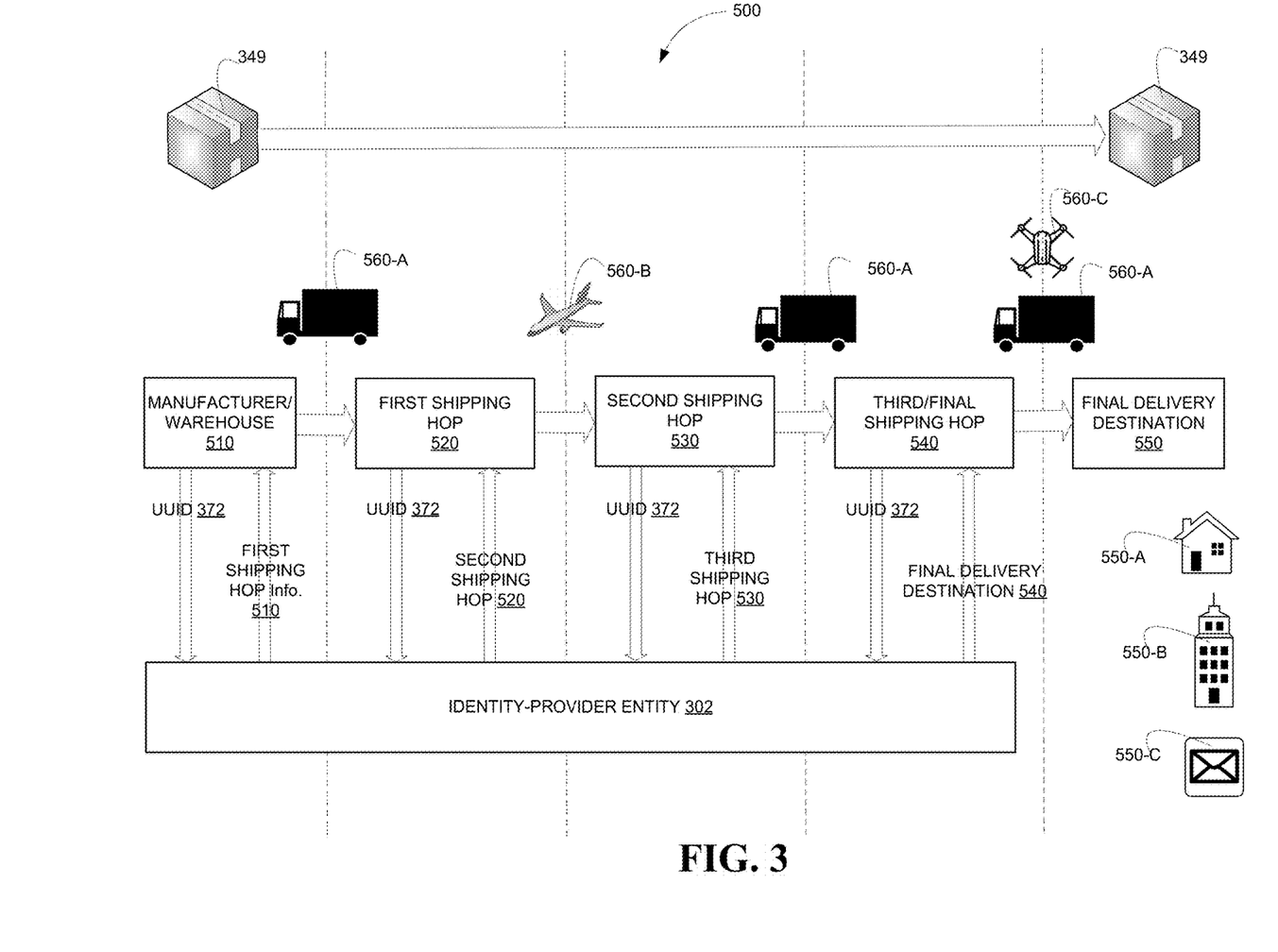
FIG. 3 is a schematic diagram of a system for conducting anonymous delivery of objects in a virtual resource event container conducted resource event, in accordance with embodiments of the present invention.

Computer-readable instructions 332 of identity-protection computing apparatus 300 additionally includes an identity-protection online resource event delivery module 370 that is configured to protect the identity of the user in terms of the user's final delivery destination (e.g., residential address, business address, drop box address or the like). The identity-protection resource event delivery module 370 may be a stand-alone module or may be incorporated as a sub-module within the identity-protection resource event module 340. The identity-protection resource event delivery module 370 is configured to, in response to the user 104 agreeing to acquire objects 349, generate a Universally Unique identifier (UUID) for each object in the resource event 348. The UUID is configured as a pointer to the next hop in the delivery route of the object and a series of UUIDs pointers dynamically and sequentially assigned collectively maps to a final delivery destination assigned by the user. In this regard, the network entity and each hop in the delivery route, up until in the final delivery hop, is provided the UUID instead of the user's final delivery destination. The UUID, which may take the form of an image-based code, such as barcode, Quick Response (QR) code or the like, is configured for providing network-access to identity-protection entity APIs, which upon presentation of the UUID provide the presenting hop with the location of the next hop in the delivery route. In this regard, each hop in the delivery route is only cognizant of the next hop in the shipping route and, up until the final hop, has no knowledge of the user's final delivery destination. FIG. 3, which is discussed in detail infra., provides further specifics as to the use of the identity-protection resource event delivery module 370 and UUIDs as a means of protecting knowledge of the user's final delivery destination from the network entity and various shipping hops in the shipping route of objects 349 in the transaction 348.

The network apparatus 400 is, in some embodiments, a server and/or another computing device or the like. The network apparatus 400 includes a processing device 420 communicatively coupled with a communication device 410 and a memory unit 430. The processing device 420 is typically configured to control the communication device 410 for communicating across the network 102 with one or more of the other systems, such as the user apparatus 200 and/or the entity protection apparatus 300. The memory unit 430 is configured for storing computer readable instructions 432 such as an operating system, other computer executable program code, applications and the like.

In specific embodiments of the invention, the computer-readable instructions 432 include a plurality of APIs 440 that are configured to allow the virtual resource event container 342, at the bequest of the user, to acquire objects(s) from the network site and conduct a resource event 348 to acquire the object(s). As previously discussed, the network apparatus 400/site and the related APIs may be configured such that the virtual resource event container 342 maintained/operated by the identity-protection entity is allowed to access the network site and/or, in other embodiments of the invention, the network site may provide the virtual resource event containers 342.

Figure 2:
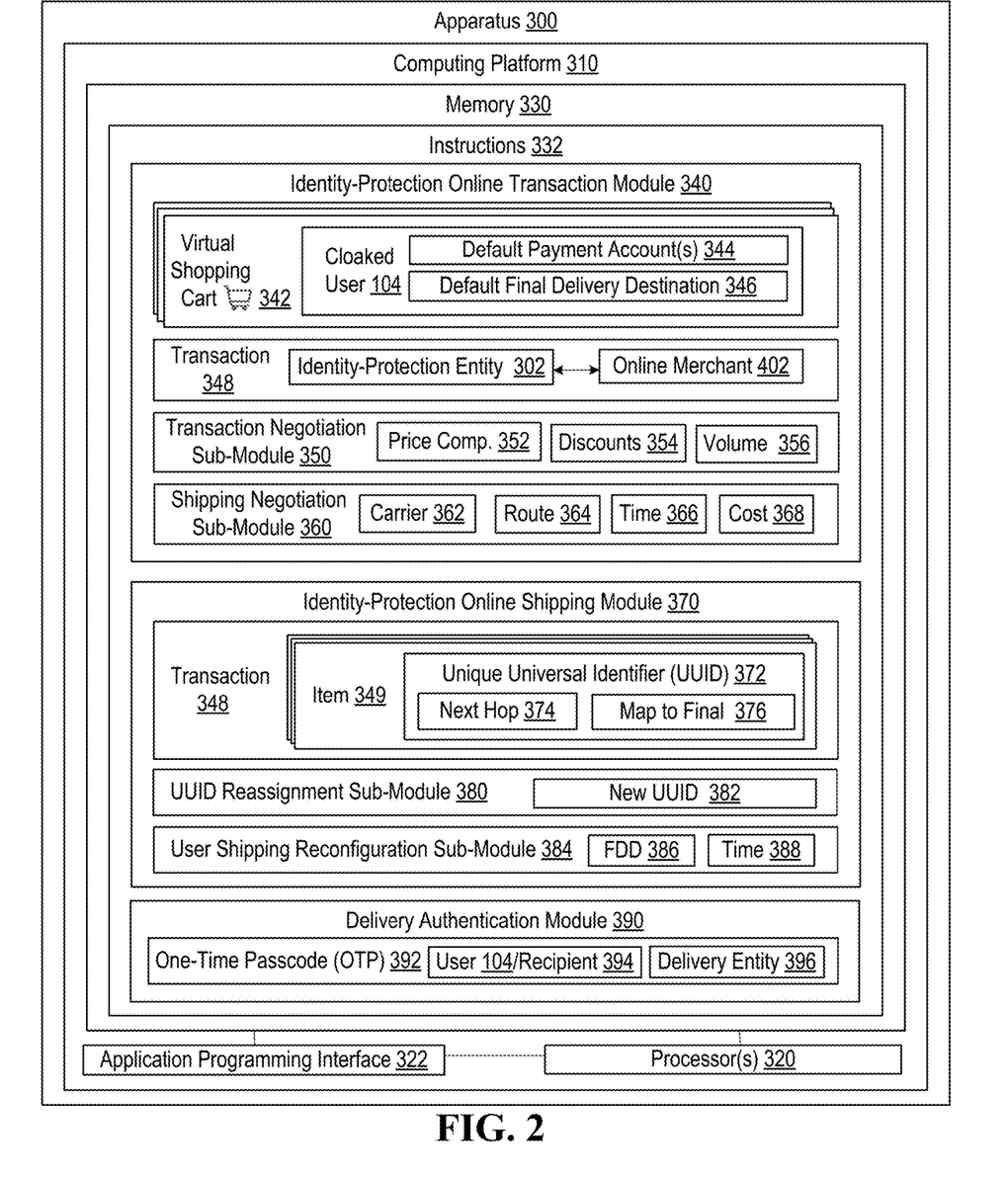
FIG. 2 is a block diagram of an apparatus for conducting anonymous resource events with a virtual resource event container, in accordance with embodiments of the present invention.

Referring to FIG. 2 a block diagram is presented of entity-protection entity apparatus 300 configured for providing a user, amongst other features discussed below, anonymous resource events, such as online shopping and shipping, in accordance with embodiments of the invention.

As previously discussed apparatus 300 may comprise one or more server devices or the apparatus may comprise one of the one or more other computing devices (e.g., mainframes, storage devices, personal computers (PCs) or the like) capable of executing computer-readable instructions 332. The apparatus 300 includes a computing platform 310 that can execute instructions, such as algorithms, modules, routines, applications and the like. Computing platform 310 includes memory 330, which may comprise volatile and non-volatile memory, such as read-only and/or random-access memory (RAM and ROM), EPROM, EEPROM, flash cards, or any memory common to computer platforms). Moreover, memory 330 may comprise cloud storage, such as provided by a cloud storage service and/or a cloud connection service.

Further, computing platform 310 also includes processor 320, which may be an application-specific integrated circuit ("ASIC"), or other chipset, logic circuit, or other data processing device. Processor 320 may be configured to provide AI and/or machine-learning processing capabilities as dictated by embodiments of the invention Processor 320 may execute one or more application programming interfaces ("APIs") 322 that interface with any resident instructions 332, such as identity-protection online resource event module 340, identity-protection resource event delivery module 370 and/or delivery authentication module 390 or the like and sub-instructions/modules associated therewith or the like stored in the memory 330 of apparatus 300.

Processor 320 may include various processing subsystems (not shown in FIG. 2) embodied in hardware, firmware, software, and combinations thereof, that enable the functionality and the operability of apparatus 300 on a distributed computing network, such as network 102 (shown in FIG. 1). For example, processing subsystems allow for initiating and maintaining communications and exchanging data with other networked devices, such as identity-protection entity apparatus 300 (shown in FIG. 1), network apparatus 400 (shown in FIG. 1) and the like. For the disclosed aspects, processing subsystems of processor 320 may include any subsystem used in conjunction with instructions 332 and related sub-instructions, modules, sub-modules routines, sub-routines, algorithms, sub-algorithms, thereof.

Computer platform 310 may additionally include a communications module/device 310 (shown in FIG. 1) embodied in hardware, firmware, software, and combinations thereof, that enables electronic communications between the apparatus 300 and other networks, such as network 102 (shown in FIG. 1) and devices/apparatus. Thus, communication module may include the requisite hardware, firmware, software and/or combinations thereof for establishing and maintaining a network communication connection.

Further, the memory 340 of apparatus 300 stores instructions 332 that are executable by processor 320. The instructions 332 include identity-protection resource event module 340, which is specific embodiments is identity-protection online transaction module 340 that is configured to conduct an anonymous online transaction for a user, in accordance with embodiments of the present invention. The identity-protection online transaction module 340 is configured to associate a cloaked user 104 with a virtual resource event container, such as a virtual shopping cart 342. Associating the user 104 with the virtual shopping cart 342 may involve associating one or more preselected user payment accounts 344 and/or a preselected final delivery destination 346. In subsequently using the virtual shopping cart 342 at an online merchant site, the user may dynamically assign a payment account and/or a final delivery destination, at the time of the transaction, which otherwise overrides any previous preselected payment account(s) and preselected final delivery destination.

The virtual shopping cart 342 is configured to access one or more online merchant sites. In this regard, the virtual shopping cart 342 is generic code which, upon user request, is executed on predetermined merchant sites to interface with the API's on the merchant sites and serves to replace actions that would otherwise be taken by the online merchant's shopping cart. As previously discussed the virtual shopping cart is maintained/operated by the identity-protection entity, which, in some embodiments of the invention, is a financial institution, credit/debit card provider or the like. In alternate embodiments of the invention, the virtual shopping carts 342 may be configured to be stored within the online merchant sites, such that, a user may "check-out" a virtual shopping cart 342 upon accessing the online merchant site.

Once the virtual shopping cart 342 has accessed a user-requested online merchant site, the user navigates the site and selects items 349 for entry into the virtual shopping cart 342. Such navigation and selection of items 349 occurs in an ordinary fashion (i.e., as if the user were not invoking the user of the virtual shopping cart 342). In response to the user agreeing to acquire the one or more items 349 placed in the virtual shopping cart 342, a transaction 348 is conducted between the online merchant 402 and the identity-protection entity 302 (i.e., the owner/operator of the virtual shopping cart 342) on behalf of the cloaked user 104. In other words, the identity-protection entity 302 uses a general payment account to conduct the transaction 348 with the online merchant 402 and subsequently conducts a corresponding transaction with user-designated payment account. As such, the online merchant has no knowledge as the user's identity.

In specific embodiments of the invention, the identity-protection online transaction module 340 includes a transaction negotiation sub-module 350 that is configured to, in response to the user agreeing to acquire item(s) in the virtual shopping cart 342 but prior to conducting the transaction 348, automatically negotiate the bill of sale for the items 349 in the transaction. As previously, discussed, the identity-protection entity 302 may be a financial institution or the like, which is in a unique position that provides an ability, above an ability afforded the user, to negotiate the bill of sale. In this regard, the transaction negotiation sub-module 350 may be configured to search the Internet for prices of items offered by other online merchants and conduct a price comparison 352 between the price offered by the online merchant 402 and the price offered by other online merchants. If a price offered by another online merchant is lower than the price offered by the online merchant 402, the transaction negotiation sub-module 350 may be configured to negotiate for the online merchant 402 to accept the lower price offered by the other online merchant. In addition, the transaction negotiation sub-module 350 may be configured to apply any known discounts 354 or other offers related to specific items in the virtual shopping cart 354. The offers/discounts 354 may be general offers/discounts 354 or offers/discounts 354 specific to the identity-protection entity 402. Moreover, the transaction negotiation sub-module 350 may be configured to negotiate volume discounts 356 based on numerous identity-protection users desiring to acquire the same item from the online merchant 402. In such embodiments of the invention, the users may agree, based on pre-configuration in a user information file or at the time of the transaction, to delay conducting the transaction for a specified period of time (e.g., 1 day, a week or the like) to allow for the identity-protection entity 402 to assemble the requisite number of users in order to qualify for the volume discount 356.

In further embodiments of the invention, the identity-protection transaction module 340 may include a shipping negotiation sub-module 360 that is configured to allow the identity-protection entity 302 to automatically negotiate specific shipping parameters, in accordance with embodiments of the present invention. The specific shipping parameters that may be automatically negotiated by the identity-protection entity include, but are not limited to, shipping carrier(s) 362, shipping route 364, shipping time 366 and shipping cost 368.

The computer-readable instructions 332 may additionally include identity-protection resource event delivery module, which in specific embodiments of the invention is an identity-protection online shipping module 370 configured to provide user anonymity to the shipping process in connection with transactions conducted with the virtual shopping cart 342, in accordance with embodiments of the present invention. As previously discussed, the identity-protection online shipping module 370 may be a stand-alone module, as depicted, or incorporated as a sub-module of the identity-protection online transaction module 340.

In response to the user agreeing to acquire the items 349 in the virtual shopping cart 342, a UUID 372 is generated and assigned to each item 349 in the transaction 348. The UUID provides a pointer to the next hop 374 in the shipping route of the item and maps 376 to the final delivery destination of the item 349. In instances in which more than one, and in some instances all of the items 349 in the transaction 348 will ship from the same manufacturer/warehouse and be delivered to the same final delivery destination the items will be assigned the same UUID. However, if an item ships from a different manufacturer/warehouse and/or is to be delivered to a different final delivery destination than other item(s) in the transaction, then each of those items will be assigned their own specific UUID.

The UUID, which may take the form of an image-based code, such as barcode, QR code or the like, may be affixed to the shipping container or written to a Radio Frequency Identification (RFID) chip associated with the item. In other embodiments of the invention, the UUID is accessible to the hop via an online portal or the like. As such, the hop that receives the shipping container will scan or otherwise receive the UUID which is configured to communicate back to the identity-protection entity 302 to receive the next hop 374 in the shipping route of the item(s). In this regard, each hop, up until the final hop, is only provided information (i.e., location/address) related to the next hop in the shipping route and, thus, is unaware of the final delivery destination. In other words, the shipping container does not contain the address of the final delivery destination or any other personal information that would otherwise identify the cloaked user 104. In addition, shipping route traceability is avoid since any hop in the delivery route does not any of the preceding hops in the delivery route. By configuring the UUID such that it communicated back to the identity-protection entity 302 to receive the next hop 374, the overall shipping route may remain fluid throughout the shipping process, allowing the identity-protection entity 302 to change hops along the shipping route as the situation dictates (e.g., weather, natural disasters or the like).

In specific embodiments of the invention, the identity protection shipping module 370 may further include a UUID reassignment sub-module 380 that is configured to assign a new UUID at each hop in the shipping route. In this regard, once a hop presents the existing UUID to the identity-protection entity 302, the identity-protection entity 302 will return a new UUID and the information on the next hop. The new UUID is only presentable by the next hop to acquire information of the subsequent next hop. By continually changing the UUID at each hop a further security measure is employed that eliminates the possibility of the UUID being used to identify all of the hops in the shipping route (i.e., avoid shipping route traceability).

In additional embodiments of the invention, the identity protection shipping module 370, includes a user shipping tracking and reconfiguration sub-module 384 that is configured to allow the user 104 to track shipment, as well as, dynamically change shipping parameters while the shipment is in route. In this regard, the user is provided an interface (e.g., online portal, application feature or the like) to dynamically adjust shipping parameters including, but not limited to, the final delivery destination 386 (e.g., change from a residential address to a temporary/vacation address), time of delivery (e.g., slow down or speed up delivery to meet the user's demands) or the like.

Additionally, the computer-readable instructions 332 may include a delivery authentication module 390 that is configured to verify a user's or other designated recipient's right to acquire possession of an item, in accordance with an embodiment of the present invention. In certain instances in which the item being delivered in of high-value (e.g., jewelry, electronics or the like) a user may designate one or more items 349 in the virtual shopping cart transaction 348 as requiring user/designated recipient authentication prior to taking possession of the item from the delivery entity 396 (e.g., delivery carrier driver, drone, mobile delivery vehicle or the like). In such instances, the delivery authentication module 390 is configured to generate and deliver, via a mobile device or the like, a one-time passcode (OTP) 392 to the user 104 or designated recipient 394. In this regard, the OTP must match the OTP provided to the delivery entity 396 (e.g., delivery carrier driver, drone, drop box, mobile delivery vehicle or the like) in order for the user 104 or designated recipient 394 to take possession of the item.

The OTP 392 process may be preferred in those embodiments in which the delivery entity 396 is not of a conventional type (e.g., delivery carrier driver) and thus cannot readily authenticate the user 104 or designated recipient via presentation of physical identification means (e.g., driver's license or the like). Such would be the case, of the shipment is delivered by an unmanned-vehicle, such as an aerial drone or if the user is picking up the shipment at a drop box or mobile drop box (i.e., a vehicle equipped with drop boxes, which notifies the user 104/designated recipient 394 when the vehicle is within a vicinity of the user). In such instances, the OTP may be used as the means to "unlock" the drop box or mobile drop box and, thus, gain possession of the items in the shipment. Thus, according to embodiments of the invention, the OTP may be configured to not only be time-sensitive (i.e., has to be presented by the user 104/recipient 394 to the delivery entity 396 within a prescribed time period) but also location-sensitive (i.e., has to be presented by the user 104/recipient 394 to the delivery entity 396 within a prescribed geographic area).

Referring to FIG. 3 a schematic diagram is presented of system 500 for anonymous shipping, in accordance with embodiments of the present invention. In the illustrated embodiments of FIG. 3 one or more items 349 from a virtual shopping cart transaction are shipped from a manufacturer or warehouse 510 to a final delivery destination 550. The final delivery destination may either be a preselected destination predefined by the user or destination dynamically defined by the user at the time of the transaction or, as previously discussed, while the item(s) are in route. In the example shown, the final delivery destination may be a residential address 550-A, a business/place of work address 550-B or a drop box address 550-C, which as previously discussed may be stationary or mobile drop box.

The manufacturer or warehouse 510 will receive request from an online merchant to ship one or more items from the virtual shopping cart transaction. The request will include a UUID that serves as a pointer to the next hop in the shipping route and maps to the final delivery destination. The manufacturer or warehouse 510 will submit the UUID 372 to the identity-protection entity 302, which, in turn, will provide the manufacturer or warehouse 510 with information 522 related to the first shipping hop 520, such as the address of the first shipping hop 520 and/or other location identifying information. The manufacturer or warehouse 520 will then deliver the items to the first shipping hop 520, in this instance the delivery occurs via vehicle 560-A and the first shipping hop is an airport.

In response to receiving the items 349, the first shipping hop 520 is provided access to the UUID 372, which may be affixed to the shipping package or electronically available to the first shipping hop, and submits the UUID 372 to the identity-protection entity 302, which, in turn, provides the first shipping hop with information 532 related to the second shipping hop 530, such as the airport of the second shipping hop 530 and/or other location identifying information. The first shipping hop 520 will then place the items in airplane 560-B for delivery to the second shipping hop 530.

In response to receiving the items 349, the second shipping hop 520 is provided access to the UUID 372, which may be affixed to the shipping package or electronically available to the second shipping hop, and submits the UUID 372 to the identity-protection entity 302, which, in turn, provides the second shipping hop with information 542 related to the third shipping hop 540, such as the address of the third shipping hop 530 and/or other location identifying information. The second shipping hop 530 will then deliver the items to the third shipping hop 540, in this instance the delivery occurs via vehicle 560-C and the first shipping hop is an airport.

In response to receiving the items 349, the third shipping hop 520, which is the final shipping hop, is provided access to the UUID 372, which may be affixed to the shipping package or electronically available to the second shipping hop, and submits the UUID 372 to the identity-protection entity 302, which, in turn, provides the third shipping hop with information 552 related to the final delivery destination 540, such as the address of the final delivery destination 550, the means for delivery to the final delivery destination and/or other location identifying information. The third shipping hop 5540 will then deliver the items to the final delivery destination 550. In this instance the delivery occurs via manned-vehicle 560-D, unmanned-vehicle 560-C, such as an aerial drone or the like. As previously noted, the final delivery destination may include, but is not limited to, a residential address 550-A, a business address 550-B or, for added anonymity purposes, a drop box location 550-C, which may be stationary or mobile. In the event that the drop-box is mobile, the drop box serves as both the delivery means and the final delivery destination.

Figure 4:
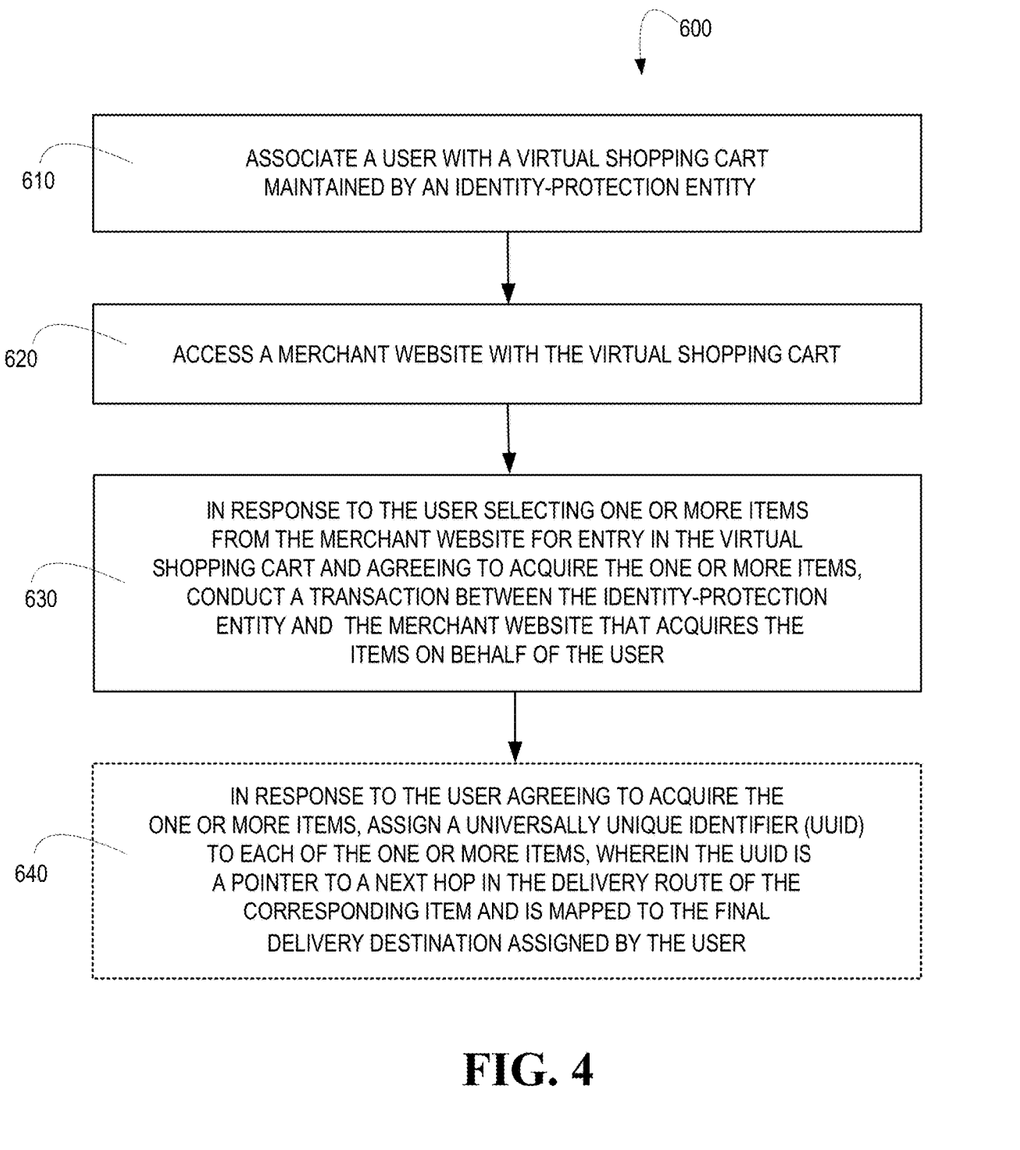
FIG. 4 is a flow diagram of a method for conducting an anonymous online transaction using a virtual shopping cart, in accordance with embodiments of the present invention.

Referring to FIG. 4 a flow diagram is depicted of a method 600 for anonymous online transactions and shipment, in accordance with embodiments of the present invention. At Event 610, a virtual shopping cart maintained/operated by an identity-protection entity is associated with a user. The virtual shopping cart is generic code capable of readily interfacing with APIs at online merchant sites. In specific embodiments of the invention, associating the user with the virtual shopping cart includes associating one or more preselected payment account(s) and one or more final delivery destinations with the virtual shopping cart. In other specific embodiments the entity-protection entity is financial institution or card provider that holds accounts associated with the user. In such embodiments, the financial institution or card provider is in a unique position to make purchases on behalf of the user at online merchants while hiding the identity of the user from the online merchants.

At Event 620, the virtual shopping cart accesses a user-requested merchant website. In this regard, the virtual shopping cart is being executed on the merchant website while the user is navigating the merchant website and serves as a replacement to the website's standard shopping cart. In specific embodiments of the invention, the merchant websites will grant authorization to the virtual shopping cart prior to allowing access.

At Event 630, in response to the user selecting one or more items from the merchant website for entry into the virtual shopping cart and agreeing to acquire the one or more items, a transaction is conducted between the entity-protection entity and the merchant website that acquires the items on behalf of the user. In this regard, the entity-protection entity provides payment to the online merchant from a general account and, subsequently, a transaction is conducted between the user and the entity-protection entity to satisfy the payment amount for the transaction. The user navigates the site and the transaction is performed without the online merchant having any identity information related to the user.

In specific embodiments of the invention, prior to completing the virtual shopping cart transaction the identity-protection entity may automatically negotiate with the online merchant at least one of the bill of sale or shipping parameters. In this regard, bill of sale negotiation may include, but is not limited to, applying known discounts, performing a price comparison with other online merchants and negotiating for at least a price match of the lowest available online merchant price, negotiating a volume sale of the item based a plurality of the identity-protection entity user's agreeing to acquire an item. Negotiating shipping parameters, may include but is not limited to, the shipping carriers, the shipping route, the delivery timing and/or the shipping cost.

At Event 640, in response to the user agreeing to acquire the one or more items, a universally unique identifier (UUID) is assigned to each of the items in the transaction. In instances in which items will be packaged and shipped together the same UUID may be assigned to those items. The UUID is a pointer to the next hop in the shipping route and a series of UUIDs pointers dynamically and sequentially assigned collectively maps to a final delivery destination assigned by the user. Each hop in the shipping route presents the UUID to the identity-protection entity and, in return, receives information associated with the next hop in the shipping route. In this regard, each hop along the shipping route is only made aware of information pertaining to the next hop and the online merchant as well as each shipping hop, up until at least the final shipping hop, is unaware of the final delivery destination. Thus, the UUID serves to further cloak the identity of the user in terms of their final delivery destination.

Thus, present embodiments of the invention, including systems, apparatus methods and/or the like, provide for a universal and portable virtual shopping cart that is maintained/operated by an identity-protection entity on behalf of a cloaked user. In this regard, the identity-protection entity acts as a purchasing proxy for the user and the online website is unaware of the identity, or any other personal information of the user. In addition, embodiments of the invention provide for items in the online transaction to be shipped, such that, the final delivery destination is unknown to the online merchant and one or more shipping hops along the shipping route. Thus, the present invention affords a user complete anonymity throughout the entire online transaction process.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for protecting an identity of a user during a resource event, the system comprising:

a computing platform including a memory and one or more processing devices in communication with the memory;

an identity-protection resource event module stored in the memory, executable by the one or more processing devices and configured to:

associate a user with a virtual resource event container maintained by an identity-protection entity, access a network entity site with the virtual resource event container, wherein the virtual resource event container is generic code configured to make Application Programming Interface (API) call-outs to the network entity site to allow the user to navigate the network entity site, and select one or more physical objects from the network entity site for entry into the virtual resource event container instead of entry of the one or more physical objects into a resource event container at the network entity site, and in response to the user selecting one or more physical objects from the network entity site for entry into the virtual resource event container and acquiescing to secure the one or more physical objects in the virtual resource event container, conduct a resource event between the identity-protection entity and a network entity associated with the network entity site that secures the one or more physical objects on behalf of the user, wherein (i) the user navigates the network entity site, selects the one or more physical objects, and acquiesces to secure the one or more physical objects, and (ii) the resource event is completed absent the network entity possessing identity information associated with the user; and an identity-protection resource event delivery module stored in the memory, executable by the one or more processing devices and configured to:

in response to the user acquiescing to secure the one or more physical objects, assign a universally unique identifier (UUID) to each of the one or more physical objects in the resource event, wherein the UUID is a pointer to a next hop in the geographical delivery route of a corresponding physical object and a series of UUIDs pointers dynamically and sequentially assigned collectively maps to a final physical delivery destination assigned by the user, wherein the network entity and one or more hops in the geographical delivery route are unaware of the final physical delivery destination.

2. The system of claim 1, wherein the identity-protection resource event delivery module is further configured to:

authenticate a hop in the geographical delivery route as a rightful possessor of at least one of the objects, receive, from the hop in the delivery route, one or more of the UUIDs associated with the at least one of the objects, provide the hop with a delivery location of a next hop in the geographical delivery route or the final physical delivery destination for each of the one or more UUIDs.

3. The system of claim 2, wherein the identity-protection resource event delivery module is further configured to:

in response to providing the hop with the delivery location of the next hop in the delivery route, reassign a new UUID to each of the at least one of the objects.

4. The system of claim 1, wherein the identity-protection resource event delivery module is further configured to:

allow the user to dynamically change at least one of (i) the final physical delivery destination and (ii) a length of time for delivery for at least one of the physical objects while the at least one of the physical objects is on route for delivery to the user.

5. The system of claim 1, wherein the identity-protection resource event delivery module is further configured to:

dynamically alter delivery logistics of at least one of the physical objects while the at least one of the physical objects is on route for delivery to the user, wherein altering the delivery logistics includes at least one of (i) changing delivery carriers, (ii) changing one or more hops, and (iii) changing a time for delivery of the at least one of the objects.

6. The system of claim 1, wherein the identity-protection resource event module is configured to associate the user with the virtual resource event container maintained by the identity-protection entity, wherein associating further comprises:

associate one or more used-defined default resource depositories and a user-defined preselected final physical delivery destination with the virtual resource event container.

7. The system of claim 1 wherein the identity-protection resource event module further comprises a resource event negotiation sub-module configured to:

prior to conducting the resource event, automatically negotiate a bill of sale for the one or more physical objects, wherein the negotiation is based on at least one of (i) discounts afforded the identity-protection entity by the network entity, (ii) other network entities or physical merchants currently offering at least one of the physical objects at a lower price than the network entity, and (iii) a volume acquisition by the identity-protection entity of at least one of the physical objects on behalf of a plurality of other users.

8. The system of claim 1, wherein the identity-protection resource event module further comprises a delivery negotiation sub-module configured to:

prior to conducting the resource event, automatically negotiate delivery logistics for at least one of the objects, wherein the negotiation is based on at least one of (i) a desired carrier, (ii) time of delivery and (iii) cost of delivery.

9. The system of claim 1, further comprising a delivery authentication module stored in the memory, executable by the one or more processing devices and configured to:

receive a request to generate a time-sensitive one-time passcode (OTP) from a shipping entity providing at least one of the physical objects to a final physical delivery destination, provide the OTP to the user or a designated object recipient, and in response to the user presenting the OTP to the shipping entity and determining that the OTP presented by the user matches the generated OTP and is within a predetermined time period, provide possession of the at least one of the physical objects to the user or the designated object recipient.

10. The system of claim 1, further comprising a delivery authentication module stored in the memory, executable by the one or more processing devices and configured to:

in response to determining that a shipping entity is within a predetermined area of the final physical delivery destination for at least one of the objects, generate a time-sensitive one-time passcode (OTP) and provide the OTP to the user or a designated object recipient;

in response to the user presenting the OTP to the shipping entity and determining that the OTP presented by the user matches the generated OTP and is within a predetermined time period, providing possession of the at least one of the physical objects to the user or the designated object recipient.

11. A computer-implemented method for protecting an identity of a user during on online transaction, the method executed by one or more processing devices and comprising:

associating a user with a virtual shopping cart maintained by an identity-protection entity;

accessing a merchant website with the virtual shopping cart, wherein the virtual shopping cart is generic code configured to make Application Programming Interface (API) call-outs to the merchant website to allow the user to navigate the merchant site, and select one or more physical items from the merchant website for entry into the virtual shopping cart instead of entry of the one or more physical items into a shopping cart at the merchant website;

in response to the user selecting one or more physical items from the merchant website for entry into the virtual shopping cart and agreeing to acquire the one or more physical items in the virtual shopping cart, conducting a transaction between the identity-protection entity and the merchant that acquires the one or more physical items on behalf of the user; and in response to the user agreeing to acquire the one or more physical items, assigning a universally unique identifier (UUID) to each of the one or more physical items in the transaction, wherein the UUID is a pointer to a next shipping hop in the geographical delivery route of a corresponding item and a series of UUIDs pointers dynamically and sequentially assigned collectively maps to a final physical delivery destination assigned by the user,
wherein (i) the user navigates the merchant website, selects the one or more physical items, and agrees to purchase the one or more physical items, (ii) the transaction is completed absent the online merchant possessing identity information associated with the user and (iii) the online merchant and one or more shipping hops in the geographical delivery route are unaware of the final shipping destination.

12. The computer-implemented method of claim 11, further comprising:
   authenticating a shipping hop in the geographical delivery route as a rightful possessor of at least one of the items;
   receiving, from the shipping hop in the delivery route, one or more of the UUIDs associated with the at least one of the items;
   providing the shipping hop with a shipping location of a next shipping hop in the geographical delivery route or the final shipping destination for each of the one or more UUIDs.

13. The computer-implemented method of claim 11, further comprising:
   prior to conducting the transaction, automatically negotiating a bill of sale for the one or more physical items, wherein the negotiation is based on at least one of (i) discounts afforded the identity-protection entity by the online merchant (ii) other online or physical merchants currently offering at least one of the physical items at a lower price than the online merchant and (iii) a volume acquisition of at least one of the physical items on behalf of a plurality of other users.

14. The computer-implemented method of claim 11, further comprising:
   prior to conducting the transaction, automatically negotiate shipping logistics for at least one of the items, wherein the negotiation is based on at least one of (i) a desired shipping carrier, (ii) time of delivery and (iii) cost of delivery.

15. The computer-implemented method of claim 11, further comprising:
   receiving a request to generate a time-sensitive one-time passcode (OTP) from a shipping entity providing at least one of the physical items to a final physical delivery destination;
   providing the OTP to the user or a designated item recipient; and
   in response to the user presenting the OTP to the shipping entity and determining that the OTP presented by the user matches the generated OTP and is within a predetermined time period, providing possession of the at least one of the physical items to the user or the designated item recipient.

16. A computer program product comprising:
   a non-transitory computer-readable medium comprising:
      a first set of codes for causing a computer to associate a user with a virtual shopping cart maintained by an identity-protection entity;
      a second set of codes for causing a computer to access a merchant website with the virtual shopping cart, wherein the virtual shopping cart is generic code configured to make Application Programming Interface (API) call-outs to the merchant website to allow the user to navigate the merchant site, and select one or more physical items from the merchant website for entry into the virtual shopping cart instead of entry of the one or more physical items into a shopping cart at the merchant website;
      a third set of codes for causing a computer to, in response to the user selecting one or more physical items from the merchant website for entry into the virtual shopping cart and agreeing to acquire the one or more physical items in the virtual shopping cart, conduct a transaction between the identity-protection entity and the merchant that acquires the one or more physical items on behalf of the user; and
      a fourth set of codes for causing a computer to, in response to the user agreeing to acquire the one or more physical items, assign a universally unique identifier (UUID) to each of the one or more physical items in the transaction, wherein the UUID is a pointer to a next shipping hop in the geographical delivery route of a corresponding item and a series of UUIDs pointers dynamically and sequentially assigned collectively maps to a final physical delivery destination assigned by the user,
   wherein (i) the user navigates the merchant website, selects the one or more physical items, and agrees to purchase the one or more physical items, (ii) the transaction is completed absent the online merchant possessing identity information associated with the user and (iii) the online merchant and one or more shipping hops in the geographical delivery route are unaware of the final shipping destination.

17. The computer program product of claim 16, wherein the non-transitory computer-readable medium further comprises at least one of:
   a fifth set of codes for causing a computer to, prior to conducting the transaction, automatically negotiating a bill of sale for the one or more physical items, wherein the negotiation is based on at least one of (i) discounts afforded the identity-protection entity by the online merchant (ii) other online or physical merchants currently offering at least one of the physical items at a lower price than the online merchant and (iii) a volume acquisition of at least one of the physical items on behalf of a plurality of other users; and
   a fifth set of codes for causing a computer to, prior to conducting the transaction, automatically negotiate shipping logistics for at least one of the items, wherein the negotiation is based on at least one of (i) a desired shipping carrier, (ii) time of delivery and (iii) cost of delivery.

\* \* \* \* \*